(12) United States Patent
Roudeau et al.

(10) Patent No.: US 7,877,185 B2
(45) Date of Patent: Jan. 25, 2011

(54) METHOD FOR PRODUCING A CONTROL SETPOINT ADAPTED TO A SLOPE AND/OR LOAD SITUATION FOR A MOTOR VEHICLE ENGINE-TRANSMISSION UNIT TRANSMISSION DEVICE AND CORRESPONDING DEVICE

(75) Inventors: Frederic Roudeau, Vitry sur seine (FR); Jean Bretheau, Antony (FR); Vincent Vermuse, Saint Germain les Arpajons (FR)

(73) Assignee: Renault S.A.S., Boulogne Billancourt (FR)

( * ) Notice: Subject to any disclaimer, the term of this patent is extended or adjusted under 35 U.S.C. 154(b) by 742 days.

(21) Appl. No.: 11/575,030

(22) PCT Filed: Sep. 5, 2005

(86) PCT No.: PCT/FR2005/050709

§ 371 (c)(1),
(2), (4) Date: Nov. 13, 2007

(87) PCT Pub. No.: WO2006/030143

PCT Pub. Date: Mar. 23, 2006

(65) Prior Publication Data
US 2008/0065302 A1    Mar. 13, 2008

(30) Foreign Application Priority Data
Sep. 10, 2004   (FR)   ................... 04 09647

(51) Int. Cl.
*B60W 30/18* (2006.01)
*B60W 50/06* (2006.01)
(52) U.S. Cl. ............... 701/58; 701/65; 701/87
(58) Field of Classification Search ............... 701/58, 701/65
See application file for complete search history.

(56) References Cited

U.S. PATENT DOCUMENTS 4,220,058 A * 9/1980 Petzold .................. 475/125

(Continued)

FOREIGN PATENT DOCUMENTS

EP    1 275 551 A1    1/2003

OTHER PUBLICATIONS

U.S. Appl. No. 11/575,072, filed Mar. 12, 2007, Roudeau, et al.

*Primary Examiner*—Thomas G Black
*Assistant Examiner*—Shelley Chen
(74) *Attorney, Agent, or Firm*—Oblon, Spivak, McClelland, Maier & Neustadt, L.L.P.

(57) ABSTRACT

A device for controlling an automated transmission of a motor vehicle engine-transmission unit adapted to deliver a torque setpoint signal to be applied to wheels of the motor vehicle including two static and dynamic components produced based on input data delivered by an input unit. The input data includes a recorded list of parameters representing the driver's wishes, the motor vehicle state, and the motor vehicle surroundings. The device includes a first unit capable of calculating a dynamic torque component not adapted to a slope and/or load situation; a second unit for adaptation to the slope and/or load situation delivering a dynamic torque component adapted to the slope and/or load situation; a third unit capable of calculating a static torque component not adapted to the slope and/or load situation; and a fourth unit for adaptation to the slope and/or load situation delivering a static torque component adapted to the slope and/or load situation.

9 Claims, 3 Drawing Sheets

U.S. PATENT DOCUMENTS

Figure 1:
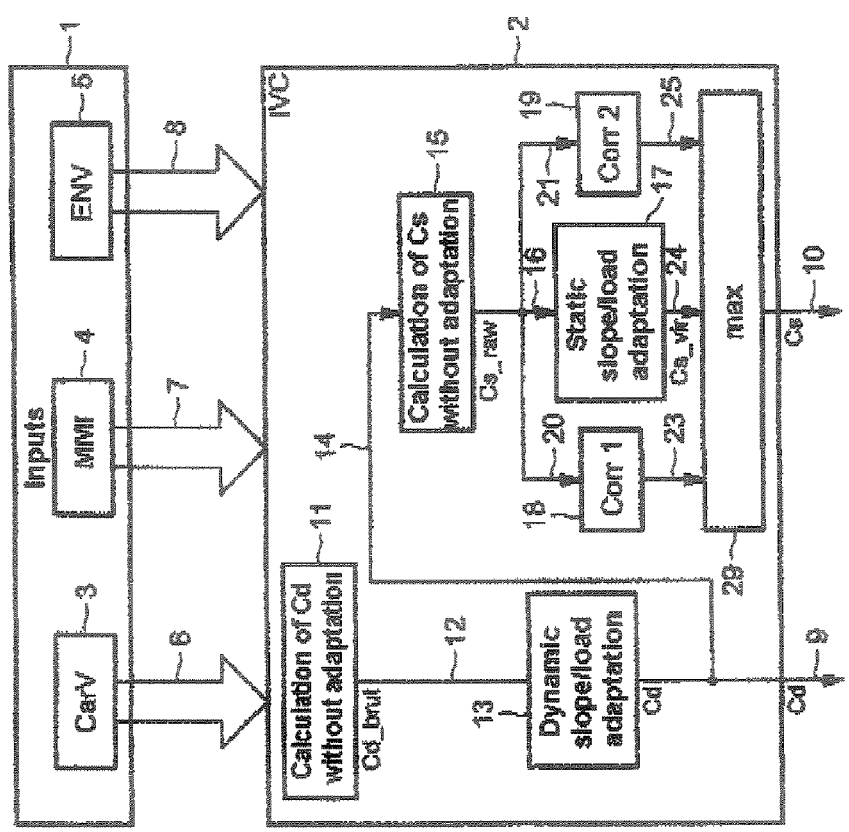

| | | | |
|---|---|---|---|
| 4,720,793 A | | 1/1988 | Watanabe et al. |
| 5,157,608 A | * | 10/1992 | Sankpal et al. ................. 701/58 |
| 5,305,663 A | * | 4/1994 | Leonard et al. .............. 475/123 |
| 5,413,539 A | * | 5/1995 | Leonard et al. ................ 475/63 |
| 5,795,265 A | * | 8/1998 | Domian et al. .............. 477/143 |
| 6,047,681 A | * | 4/2000 | Scherer et al. ......... 123/406.46 |
| 6,269,296 B1 | * | 7/2001 | Toukura et al. ................ 701/80 |
| 6,283,893 B1 | * | 9/2001 | Fritzner et al. .............. 477/176 |
| 6,346,064 B1 | | 2/2002 | Hada et al. |
| 6,366,843 B1 | * | 4/2002 | Dreibholz et al. .............. 701/51 |
| 6,497,212 B2 | * | 12/2002 | Matsumoto et al. ......... 123/295 |
| 2001/0013329 A1 | * | 8/2001 | Matsumoto et al. ......... 123/295 |
| 2007/0250239 A1 | * | 10/2007 | Roudeau et al. ................ 701/60 |

* cited by examiner

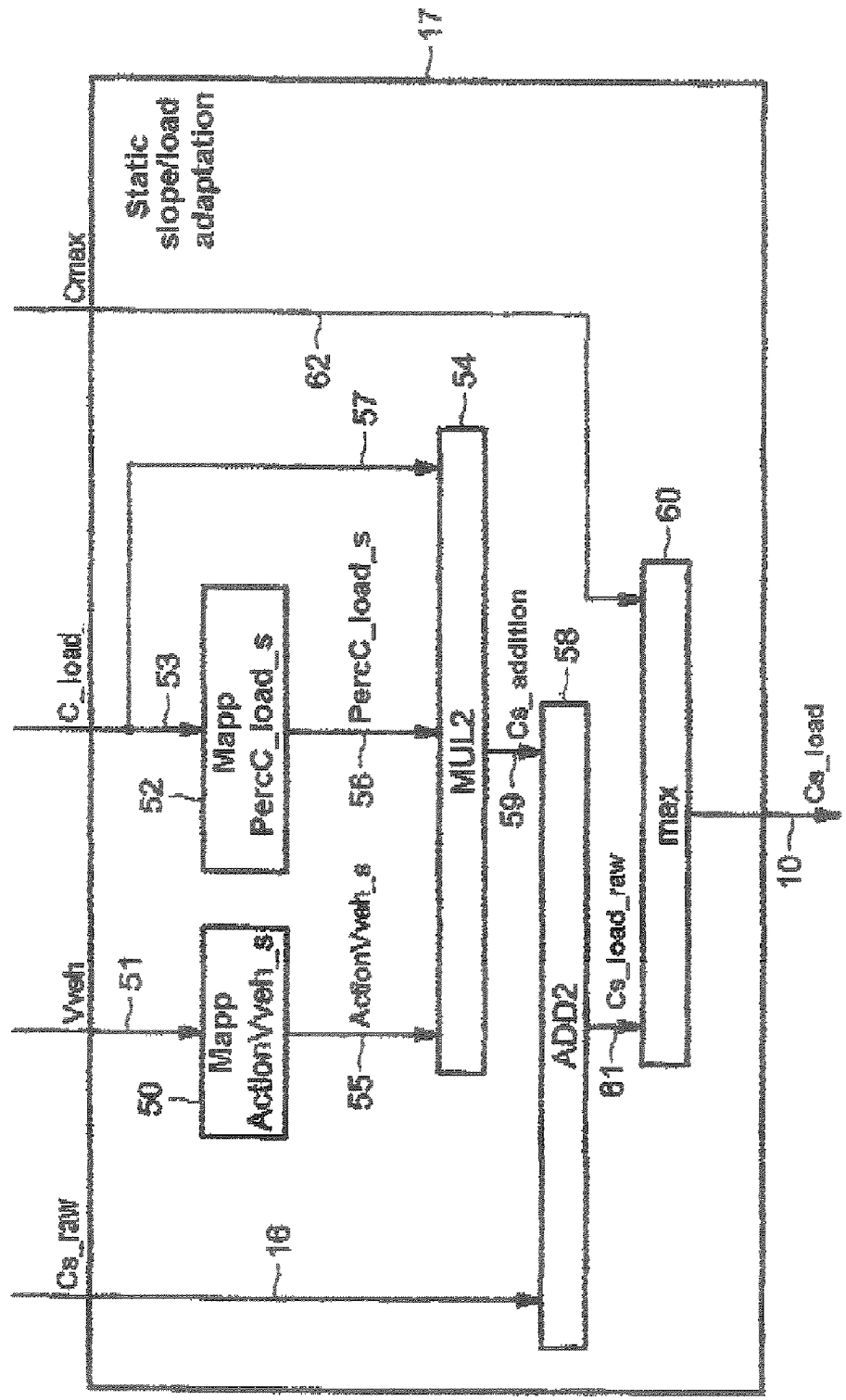

METHOD FOR PRODUCING A CONTROL SETPOINT ADAPTED TO A SLOPE AND/OR LOAD SITUATION FOR A MOTOR VEHICLE ENGINE-TRANSMISSION UNIT TRANSMISSION DEVICE AND CORRESPONDING DEVICE

The present invention relates to a method of controlling a transmission device of a motor vehicle power train in a so-called slope and/or load situation. It also relates to a device implementing such a method of control.

This method applies advantageously to automated transmission devices in particular Impulse Control boxes termed BCI, Automatic Control Boxes termed BVA and Robotized Gear Boxes termed BVR, but also continuous-ratio transmissions, such as CVT ("Continuous Variable Transmission"), IVT ("Infinitely Variable Transmission") and hybrid transmissions.

A motor vehicle automated transmission conventionally comprises a control block receiving one or more input parmeters interpreting inter alia, the desire of the driver. Then, as a function of the value of these parameters, the control block delivers a control setpoint with a view to an application to the wheels of the motor vehicle.

An upgrade of such a control block has already been described in the document FR-A-2827339, in the name of the Applicant. This document details a device for controlling the operating point of a power train. The control carried out by this device is a torque control to be applied to the wheels of the motor vehicles. As defined in the document FR-A-2827339, the value of the torque to be applied to the wheels of the motor vehicle, is calculated directly at the wheels of the motor vehicle.

The device of document FR-A-2827339 possesses a module for interpreting the desire of the driver called an IVC module.

The IV module generates a torque setpoint to be applied to the wheels, destined for a block for optimizing the operating point OPF. The latter transmits said torque with a view to a torque control to be applied to the wheels of the motor vehicle. The OPF block simultaneously generates an engine revs setpoint on the basis of the setpoint of said torque to be applied to the wheels of the motor vehicle. This torque setpoint to be applied to the wheels of the motor vehicle is determined as a function of the desire of the driver, of the characteristics of the motor vehicle and of its environment, so as to best adapt the behavior of the motor vehicle, according to the driving situations.

In a slope and/or load situation, it is indispensable to adapt the torque setpoint to be applied to the wheels of the motor vehicle, so as to offer the driver optimal driving comfort.

The load of the motor vehicle evolves in particular according to:
  the taking on board of an addition load (passenger(s), luggage, etc.),
  the traction of an additional running load trailer, caravan, etc.)
  the effect of the wind on the body of the motor vehicle.

Furthermore, the effect of the slope of the road (uphill or downhill) also requires an adaptation of the setpoint delivered to the wheels of the motor vehicle.

For example, the motor vehicle, equipped with a conventional automatic transmission, does not differentiate a downhill situation from an accelerator pedal rest position. For this reason the computer chooses the longest transmission ratio to the detriment of engine brake. The sensation of entrainment experienced by the occupants of the motor vehicle is then very uncomfortable.

A device for estimating the load of the motor vehicle generating a torque setpoint representative of the load to which the motor vehicle is subject is known in the prior art, through document FR-2 822 972 in the name of the Applicant. This device relates only to automatic boxes with continuously or infinitely variable transmission.

A device for automatic adaptation of a gearbox to a downhill situation is also known through patent application FR-2791751 in the name of the Applicant and PSA. This device generates box ratio setpoints and is adapted to transmissions with discrete ratio. Specifically, it is difficult to manage and furthermore lacks precision in the case of gearboxes with continuous transmission.

Patent application FR-2 801 952 in the name of the Applicant and PSA proposes a method of controlling an automatic transmission as a function of the profile of the road. This device generates a torque control setpoint according to two shifting laws. These shifting laws are determined as a function of a threshold dependent on the slope of the road. The device of document FR-2 801 952 is intended for transmission boxes with discrete ratios.

The present invention is aimed at remedying the aforesaid drawbacks. The principle of the proposed device consists in envisaging an adaptation of the torque setpoint to be applied to the wheels of the motor vehicle so as to improve the behavior of the motor vehicle in a slope and/or load situation. The invention envisages increasing the torque setpoint to be applied to the wheel (within the meaning previously defined) available, in a climb and/or load situation so as to improve the vehicles acceleration potential. Furthermore the device proposes to increase the torque setpoint to be applied to the wheel available in a downhill situation so as to augment engine brake in this case.

Furthermore, the adaptation proposed by the invention is capable of operating with any type of transmission.

Accordingly, the invention proposes a method of controlling an automated transmission of a power train for motor vehicle comprising a step of formulating a torque setpoint to be applied to the wheel, composed of two components, static and dynamic, formulated as a function of input data representative of the characteristics of the motor vehicle of the desire of the driver and of the environment of the motor vehicle. The static component and the dynamic component of torque respectively applicable and applied to the wheels of the motor vehicle form the object of a adaptation to a slope and/or load situation, as a function of a list of predetermined parameters, said adaptation to a slope and/or load situation comprising the following steps:
  calculating a dynamic component of raw torque without adaptation to a slope and/or load situation, representative of the desire of the driver as a function of predetermined input parameters,
  calculating a dynamic torque component adapted to the slope and/or load situation on the basis of said dynamic component of raw torque,
  determining a static component of raw torque on the basis of said dynamic torque component,
  calculating a static torque component adapted to a slope and/or load situation, on the basis of said static component of raw torque.

This method makes it possible to generate a torque setpoint at the wheels of the motor vehicle (within the meaning previously defined) adapted to a slope and/or load situation. The proposed solution allows on the one hand the motor vehicle to have available a sufficient torque reserve to accelerate in spite of the load and/or of the slope, and on the other hand the passengers of the motor vehicle not to experience the unpleasant sensations related to the loss of engine brake in a downhill situation.

Preferably, said static torque component adapted to a slope and/or load situation is integrated with additional corrections, dependent on the driving phase considered, so as to deliver an optimal static torque component.

According to one mode of implementation, it is possible to adapt the setpoint to a slope and/or load situation as a function of a signal representative the position of the accelerator pedal of the motor vehicle.

The signal representative of the accelerator pedal, of the motor vehicle makes it possible in particular to evaluate the sportiness of the driver.

According to another mode of implementation, it is possible to adapt the setpoint to a slope and/or load situation as a function of the whole set of resistive torques applied to the motor vehicle, measured or estimated at the wheel of the motor vehicle and representative of the load onboard the motor vehicle and/or of the unevenness of the road profile.

According to another mode of implementation, it is possible to adapt the setpoint to a slope and/or load situation as a function of the speed of the motor vehicle.

According to another mode of implementation, it is possible to adapt the setpoint to a slope and/or load situation as a function of the instantaneous maximum torque applicable to the wheels of the motor vehicle.

According to another mode of implementation, it is possible to adapt the setpoint to a slope and/or load situation as a function of the engine revs of the motor vehicle.

Preferably, the step of calculating the dynamic torque component adapted to the slope and/or load situation can comprise the following steps:
  calculating a weighting variable making it possible to activate the adaptation of the setpoint to a slope and/or load situation if the dynamic component of raw torque takes positive values,
  calculating a weighting variable that may or may not activate the adaptation of the setpoint to a slope and/or load situation as a function of a threshold dependent on the speed of the motor vehicle,
  calculating a percentage variable calibrated as a function of the correction made to the positive dynamic component of raw torque, on account of the slope and/or load situation,
  comparing and integrating the variables calculated during the preceding three calculation steps, with a list of predetermined input parameters comprising the dynamic component of raw torque, of the instantaneous maximum torque applicable to the wheel, of the speed of the motor vehicle and of the resistive torque applied to the motor vehicle.

According to one mode of implementation, the step of calculating the static torque component adapted to the slope and/or load situation can comprise the following steps:
  calculating a weighting variable that may or may not activate the adaptation of the setpoint to a slope and/or load situation as a function of a threshold dependent or the speed of the motor vehicle,
  calculating a percentage variable, calibrated as a function of the correction made to the static component of raw torque, on account of the slope and/or load situation,
  calculating comparing and integrating the variables calculated during the preceding two calculation steps, with a list of predetermined input parameters comprising the static component of raw torque, of the instantaneous maximum torque applicable to the wheel, of the speed of the motor vehicle and of the resistive torques applied to the motor vehicle.

The invention is also aimed at a device for controlling an automated transmission of a power train for motor vehicle able to deliver a torque setpoint signal to be applied to the wheels of the motor vehicle comprising two components, static an dynamic, formulated as a function of input data delivered by an input block, said input data comprising a recorded list of parameters representative of the desire of the driver, of the state of the motor vehicle and of the environment of the motor vehicle. The device advantageously comprises:
  a first block able to calculate a dynamic torque component without adaptation to a slope and/or load situation,
  a second block for adaptation to the slope and/or load situation delivering a dynamic torque component adapted to the slope and/or load situation as a function of a first list of predetermined input parameters,
  a third block able to calculate a static torque component without adaptation to a slope and/or load situation,
  a fourth block for adaptation to the slope and/or load situation delivering a static torque component adapted to the slope and/or load situation as a function of a second list of predetermined input parameters.

According to one embodiment, the control device can comprise means able to integrate the static torque component adapted to a slope and/or load situation with additional corrections dependent on the driving phase considered.

According to another embodiment, the first list of predetermined parameters of the second block for adaptation to the slope and/or load situation can comprise spinals representative of the dynamic component of raw torque, of the instantaneous maximum torque applicable to the wheels of the motor vehicle, of the speed of the motor vehicle and of the resistive torques applied to the motor vehicle.

According to another embodiment, the second list of predetermined parameters of the fourth block for adaptation to the slope and/or load situation can comprise signals representative of the static component of raw torque, of the instantaneous maximum torque applicable to the wheels of the motor vehicle, of the speed of the motor vehicle and of the resistive torques applied to the motor vehicle.

Preferably, the second block for adaptation to the slope and/or load situation can comprise:
  means able store a first mapping capable of delivering a weighting variable making it possible to activate the adaptation of the setpoint to a slope and/or load situation if the dynamic component of raw torque takes positive values,
  means able to store a second mapping capable of delivering a weighting variable that may or may not activate the adaptation of the setpoint to a slope and/or load situation as a function of a threshold dependent on the speed of the motor vehicle, (ActionVveh_d)
  means able to store a third mapping capable of delivering a percentage variable, calibrated as a function of the correction made to the positive dynamic component of raw torque, on account of the slope and/or load situation,
  means for comparing and for integrating the variables delivered by said means able to store the mappings, with variables of said first list of predetermined parameters, Preferably, the fourth block for adaptation to the slope and/or load situation can comprise:
  means able to store a first mapping capable of delivering a variable that may or may not activate the adaptation of the setpoint to a slope and/or load situation as a function of a threshold dependent on the speed of the motor vehicle, means able to store a second mapping delivering a percentage variable, calibrated as a function of the correction made to the static component of raw torque, on account of the slope and/or load situation, means for comparing and for integrating the variables delivered by said means able to store the mappings, with variables of said second list of predetermined parameters.

Figure 2:
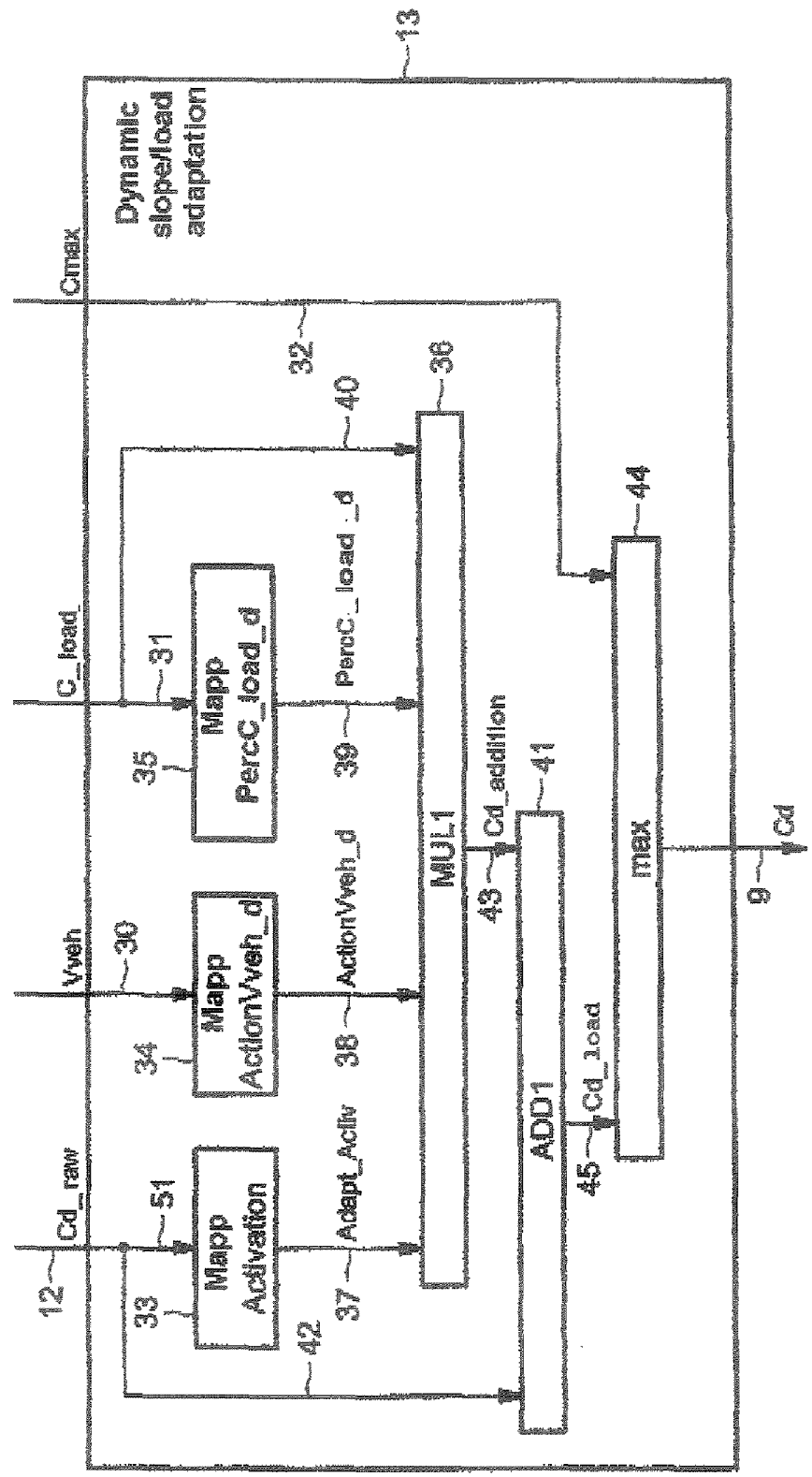

Other advantages and characteristics of the invention will appear on examining the detailed description of a wholly nonlimiting embodiment of the invention, and the appended drawings, in which:

FIG. 1 is a schematic diagram of an exemplary embodiment of an IVC module integrating the adaptation of the setpoint in the slope and/or load phase, FIG. 2 represents more precisely an exemplary embodiment of a detail of the diagram of FIG. 1, FIG. 3 represents more precisely an exemplary embodiment of another detail of the diagram of FIG. 1.

We refer to FIG. 1. Represented in this figure is the integration of the device for adapting the torque setpoint to be applied to the wheels of the motor vehicle in the slope and/or load phase, into the automated transmission box (not represented) of the motor vehicle.

This device comprises two blocks 1 and 2, respectively an input block 1 and an IVC module 2.

The function of the input block 1 is to deliver the input parameters to the module 2 for the adjustment of the torque setpoint to be applied to the wheels of the motor vehicle, in the slope and/or load phase. The block 1 receives as input signals delivered by sensors (not represented) integrated with the motor vehicle.

These input data, transmitted to the module 2 by the block 1, can be delivered respectively to each functional block included in this module 2.

The input block 1 comprises three modules 3, 4 and 5. Each of these three modules delivers a predetermined type of input data to the module 2.

A first module 3 denoted CarV is capable of formulating the data relating to the characteristics of the motor vehicle. These are programmed and stored in a memory (not represented) common to the device by the constructor so as to characterize the behavior of the vehicle delivered to a customer.

A second module 4 denoted MMI (man/machine interface) is capable of formulating data relating to the desire of the driver. These data interpret the wishes of the driver. They can for example comprise signals representative of the accelerator pedal of the motor vehicle or else a signal interpreting the sportiness of the driver.

A third module denoted 5 ENV is capable of formulating signals relating to the environment of the motor vehicle. These make it possible to take account of the state of the motor vehicle and of its situation in the environment. They comprise for example the whole set of resistive torques applied to the motor vehicle and representative of the load onboard the motor vehicle and/or of the unevenness of the road profile. By convention, the variable representative of the whole set of these resistive torques is positive when the motor vehicle is in a climb situation or in a load situation and negative when the motor vehicle is in a downhill situation.

The signals delivered by the three modules 3, 4 and 5 are formulated on the basis of signals originating from sensors (not represented) integrated with the motor vehicle.

These three modules 3, 4 and 5 are respectively connected to the IVC module 2, by way of the connections 6, 7 and 8.

The IVC module 2, described in document FR-A-2 827 339, in the name of the Applicant, represents block able to generate a torque setpoint to be applied to the wheels of the motor vehicle by interpreting the desire of the driver.

The module 2 receives as input the input parameters formulated by the block 1 and delivers as output the dynamic Cd (or dynamic torque setpoint) and static Cs (or static torque setpoint) components of the torque setpoint to be applied to the wheels of the motor vehicle. The two setpoints are respectively transmitted by way of the connections 9 and 10. The setpoints Cd and Cs are targets intended to be used so as to attain, among other things, an optimal engine revs setpoint.

The dynamic torque setpoint Cd is the value of the torque that the driver wishes to see achieved instantaneously. The static torque setpoint Cs is defined as the future setpoint torque that the driver could demand and that the power train must render immediately available at the wheels of the motor vehicle. The setpoint Cs evolves slowly. Specifically, it is not aimed at meeting an immediate demand of the driver. It has to be the reflection of a tendency imposed by the behavior of the driver over a predetermined period. Stated otherwise, the torque Cs corresponds to the torque value applicable to the wheels of the motor vehicle that the driver would wish to obtain by reloading the accelerator pedal of the motor vehicle.

The module 2 comprises at least four functional blocks 11, 13, 15 and 17.

The first functional block 11 (Calculation of Cd without Adaptation) is a block able to calculate a dynamic component of raw torque, denoted Cd_raw, without adaptation to a slope and/or load situation. This setpoint Cd_raw is calculated on the basis of a signal representative of the position of the accelerator pedal, of the engine revs of the motor vehicle, of the whole set of resistive torques applied to the motor vehicle and the speed of the motor vehicle.

The block 11 delivers, via a connection 12, the Cd_raw variable to the second functional block 13 (Dynamic load/slope adaptation) of the module 2. This block makes it possible to adapt the dynamic torque component to a slope and/or load situation. The block 13, which will be seen in greater detail hereafter delivers the adapted dynamic torque setpoint Cd via a connection 9.

The third functional block is a block 15 (Calculation of Cs without adaptation) which is capable of calculating a Cs_raw static torque setpoint without adaptation to the slope and/or load situation. The setpoint Cs_raw is formulated on the basis of the dynamic torque Cd, arising from the block 13 and transmitted via the connection 14. Furthermore, the setpoint Cs_raw is calculated as a function of parameters such as the sportiness of the driver for example.

The setpoint Cs_raw delivered, by way of the connection 16 to the fourth functional block 17 integrated with the module 2. The function of the block 17 (Static load/slope adaptation) is to formulate, on the basis of the setpoint Cs_raw, a torque setpoint to be applied to the wheels of the motor vehicle, adapted to the slope, and/or load situation Cs_load. The setpoint Cs_load delivered by the block 17 affords the possibility of improving the operating point of the motor vehicle. Specifically, the operating point will make it possible to preset the value of the engine revs to a value anticipating the desire of the driver. The block 17 will be described in greater detail hereafter.

In parallel with the adaptation to the slope and or load situation, the setpoint Cs_raw undergo other corrections, for example in a braking or cornering situation. These additional corrections are performed respectively by the two corrective blocks 18 Corr1 and 19 Corr2. The setpoint Cs_raw is transmitted to the blocks 15 and 19 via the respective connections 20 and 21.

The three blocks 17, 18 ad 19 deliver their output setpoints to the block 22 denoted max. The block 18 delivers its setpoint to the block 22 via a connection 23, the block 17 via a connection 24 and the block 19 via a connection 25.

The block 22, placed at the output of the blocks 17, 18 and 19 arbitrates the various corrections effected by these three blocks. Specifically the setpoint Cs can comprise at one and the same time an adaptation for slope and/or for load and an adaptation for braking for example. The block 22 then delivers as output an output setpoint Cs integrating the various corrections made.

FIG. 2 is now referred to. This figure details the block 13 carrying out the adaptation of the setpoint Cd_raw in the slope and/or load phase.

The block 13 receives various parameters such as the setpoint Cd_raw transmitted via the connection 12 and the input parameters, delivered by the block 1 of FIG. 1, such as the speed of the motor vehicle, denoted Vveh, transmitted via the connection 30, the whole set of resistive torques applied to the motor vehicle denoted C_load, transmitted via the connection 31 and the maximum torque applicable to the wheels of the motor vehicle denoted Cmax transmitted via the connection 32.

The parameter C_load groups together the whole set of resistive torques measured at the wheel and due either to the load onboard the motor vehicle or to the unevenness of the road profile.

Moreover, the component Cmax is the maximum torque applicable to the wheels of the motor vehicle and that the power train can provide to the wheels of the motor vehicle. This component Cmax is produced with the aid of a recorded table (not represented) which is addressed, in a preferred embodiment, as a function of the rotation speed measured at the wheel of the motor vehicle. The value Cmax therefore evolves dynamically as a function of the speed of the motor vehicle.

The block 13 comprises several functional blocks allowing the construction of the setpoint Cd.

Firstly, the block 13 comprises a first mapping 33 (Mapp Activaton) which delivers a weighting variable Adapt_Activ, as a function of the setpoint Cd_raw. The variable Adapt_Activ is zero if the setpoint Cd_raw is negative and takes positive values if the setpoint Cd_raw is positive, thereby making it possible to deactivate the correction if the driver of the motor vehicle does not activate the accelerator pedal of the motor vehicle.

A second mapping 34 (Mapp ActionVveh_d) is placed parallel to the mapping 33, and receives as input the speed of the motor vehicle Vveh via the connection 30. The function of the mapping 34 is to formulate a weighting denoted ActionVveh_d, taking values between "0" and "1" and making it possible to disable the function. The signal ActionVveh_d, delivered by the mapping 34, makes it possible to cancel the correction, for the dynamic torque, in the slope and/or load phase on the basis of a suitable threshold, determined by the mapping 34. The signal ActionVveh_d then ensures a progressive disappearance of the correction as a function of the variation of the speed of the motor vehicle.

A third mapping 35 (Mapp PercC_load_d) situated parallel to the mapping 34 receives as input, via the connection 31, the parameter C_load. The mapping 35 delivers as output a variable denoted PercC_load_d as a function of the parameter C_load. The mapping 35 is defined in the following manner: for the negative values of C_load, PercC_load_d takes zero values (thereby making it possible to cancel the correction when the motor vehicle is in a downhill phase), and for the positive values of C_load, PercC_load_d takes values lying between "0" and "1" so as to calibrate the correction made.

The signals Adapt_Activ, ActionVveh_d and PercC_load_d, are delivered to a multiplier 36 MUL1 by way of the respective connections 37, 38 and 39. The multiplier 36 also receives as input the component C_load via a connection 40. The multiplier generates a variable Cd_addition by multiplying the variable PercC_load_d by C_load, the multiplication being weighted by Adapt_Activ and ActionVveh_d. The variable Cd_addition represents the quantity of dynamic torque applied to the wheel (within the meaning previously defined) that it is wished to add to Cd_raw so as to correct the climb and/or load effect.

An adder 41 ADD, situated at the output of the multiplier 36, has the function of adding to the setpoint Cd_raw, transmitted to the adder 41 via a connection 42, the additional quantity of dynamic torque applied to the wheel, Cd_addition, transmitted to the adder 41 via a connection 43.

A block max 44 is situated at the output of the adder 41. It receives as input the resulting variable denoted Cd_load, delivered by the adder 41 to the block 44 by way of a connection 45. The block 44 has the role of saturating the variable Cd_load at the current value Cmax, that the block 44 also receives as input via the connection 32. The block 44 delivers as output, via the connection 9, the setpoint Cd actually applied.

FIG. 3 which details the block 17 represented in FIG. 1 is now referred to.

The block 17 comprises in particular two functional blocks able to adapt the setpoint Cs_raw to a slope and/or load situation.

Firstly, the block 17 comprises a first mapping 50 (Mapp ActionVveh_s) which receives as input the speed of the motor vehicle Vveh via the connection 51. The function of the mapping 50 is so formulate a weighting denoted ActionVveh_s, taking values between "0" and "1" making it possible to activate the correction only when the speed of the motor vehicle is less than a predetermined threshold. The signal ActionVveh_s, delivered by the mapping 50, makes it possible to cancel the corrections, for the static torque, in the slope and/or load phase on the basis of a suitable threshold determined by the mapping 50. The signal ActionVveh_s then ensures a progressive disappearance of the correction as a function of the variation of the speed of the motor vehicle Vveh.

The block 17 comprises a second mapping 52 (Mapp PercC_load_s) receiving as input, via a connection 53, the input variable C_load. The mapping 52 delivers as output a variable PercC_load_s. The mapping 52 is defined in the following manner: for negative values of C_load, the variable PercC_load_s takes values lying between −1 and 0 and for the positive values of C_load, PercC_load_s takes values lying between 0 and 1. In both cases, the values taken by PercC_load_s make it possible to calibrate the effect of the correction.

The signals ActionVveh_s and PercC_load_s, are delivered to a multiplier 54 MUL2 by way of the respective connections 55, and 56. The multiplier 54 also receives as input the component C_load via a connection 57. The multiplier generates a variable Cs_addition by multiplying the variable PercC_load_s by C_load, the multiplication being weighted by ActionVveh_s. The variable Cs_addition represents the quantity of static torque applicable to the wheel (within the sense previously defined) that one wishes to add to Cs_raw so as to correct the slope and/or load effect.

An adder 58 ADD2, situated at the output of the multiplier 54, has the function of adding to the setpoint Cs_raw, transmitted to the adder 58 via the connection 16, the quantity of static torque applied to the additional wheel, Cs_addition (which by construction can only be positive or zero). The variable Cs_addition is transmitted to the adder 58 via a connection 59.

A block 60 max is situated at the output of the adder 58. It receives as input the resulting variable denoted Cs_load_raw delivered by the adder 58 to the block 60, by way of a connection 61. The block 60 has the role of saturating the variable Cs_load_raw at the current value Cmax, that the block 60 also receives as input via the connection 62. The block 60 delivers as output, via the connection 10, the setpoint Cs_load, adapted to a slope and/or load situation.

The dynamic Cd and static Cs torque components thus increased, respectively by the components Cd_addition and Cs_addition, afford several advantages in a slope and/or load situation. They make it possible to preset the power train on an operating point, thus offering a greater torque reserve applicable instantaneously to the motor vehicle wheel, thereby allowing the motor vehicle to accelerate more rapidly in an uphill situation or in the event of a load onboard the motor vehicle. Specifically, to obtain the torque reserve applicable to the motor vehicle wheel, the power train is set on an engine revs operating point (formulated as a function of the torque to be applied to the motor vehicle wheel) that is greater than it would have been without this increased demand.

Moreover, in a downhill situation, the power train can set itself on an engine revs operating point that is greater than the value of a setpoint without adaptation. This results in an increased engine brake potential.

The invention claimed is:

1. A method of controlling an automated transmission of a power train for a motor vehicle, comprising:
   formulating a torque setpoint to be applied to wheels of the motor vehicle, including static and dynamic components, formulated as a function of input data representative of characteristics of the motor vehicle, of a desire of the driver, and of an environment of the motor vehicle, wherein the static component and the dynamic component of torque respectively applicable and applied to the wheels of the motor vehicle form the subject of an adaptation to a slope and/or load situation, as a function of a list of predetermined parameters, the adaptation to a slope and/or load situation comprising:
   calculating a dynamic component of raw torque without adaptation to the slope and/or load situation, representative of the desire of the driver as a function of predetermined input parameters,
   calculating a dynamic torque component adapted to the slope and/or load situation on the basis of the dynamic component of raw torque,
   determining a static component of raw torque on the basis of the dynamic torque component,
   calculating a static torque component adapted to the slope and/or load situation, on the basis of the static component of raw torque.

2. The method as claimed in claim 1, wherein the static torque component adapted to the slope and/or load situation is integrated with additional corrections, dependent on a driving phase considered, so as to deliver an optimal static torque component.

3. The method as claimed in claim 1, wherein the setpoint is adapted to the slope and/or load situation as a function of a signal representative of a position of an accelerator pedal of the motor vehicle.

4. The method as claimed in claim 1, wherein the setpoint is adapted to the slope and/or load situation as a function of a whole set of resistive torques applied to the motor vehicle, measured or estimated at the wheel of the motor vehicle and representative of a load onboard the motor vehicle and/or of unevenness of a road profile.

5. The method as claimed in claim 1, wherein the setpoint is adapted to the slope and/or load situation as a function of speed of the motor vehicle.

6. The method as claimed in claim 1, wherein the setpoint is adapted to the slope and/or load situation as a function of instantaneous maximum applicable to the wheels of the motor vehicle.

7. The method as claimed in claim 1, whereby the setpoint is adapted to the slope and/or load situation as a function of engine revs of the motor vehicle.

8. The method as claimed in claim 1, wherein calculating the dynamic component of torque adapted to the slope and/or load situation comprises:
   calculating a weighting variable making it possible to activate the adaptation of the setpoint to the slope and/or load situation if the dynamic component of raw torque takes positive values,
   calculating a weighting variable that may or may not activate the adaptation of the setpoint to the slope and/or load situation as a function of a threshold dependent on speed of the motor vehicle,
   calculating a percentage variable, calibrated as a function of the correction made to the positive dynamic component of raw torque, on account of the slope and/or load situation,
   comparing and integrating the variables calculated during the preceding three calculations, with a list of predetermined input parameters comprising the dynamic component of raw torque, the instantaneous maximum torque applicable to the wheel, the speed of the motor vehicle, and resistive torques applied to the motor vehicle.

9. The method as claimed in claim 1, wherein the calculating the static torque component adapted to the slope and/or load situation comprises:
   calculating a weighting variable that may or may not activate the adaptation of the setpoint to the slope and/or load situation as a function of a threshold dependent on speed of the motor vehicle,
   calculating a percentage variable, calibrated as a function of the correction made to the static component of raw torque, on account of the slope and/or load situation,
   calculating, comparing, and integrating the variables calculated during the preceding two calculations, with a list of predetermined input parameters comprising the static component of raw torque, the instantaneous maximum torque applicable to the wheel, the speed of the motor vehicle, and resistive torques applied to the motor vehicle.

* * * * *